(12) United States Patent
Krut

(10) Patent No.: US 10,554,394 B1
(45) Date of Patent: Feb. 4, 2020

(54) TOGGLE MUTE

(71) Applicant: William Krut, Raleigh, NC (US)

(72) Inventor: William Krut, Raleigh, NC (US)

( * ) Notice: Subject to any disclaimer, the term of this patent is extended or adjusted under 35 U.S.C. 154(b) by 136 days.

(21) Appl. No.: 15/721,943

(22) Filed: Oct. 1, 2017

Related U.S. Application Data

(60) Provisional application No. 62/402,895, filed on Sep. 30, 2016.

(51) Int. Cl.
*H04L 29/06* (2006.01)
*H04L 9/08* (2006.01)

(52) U.S. Cl.
CPC ........ *H04L 9/0833* (2013.01); *H04L 2209/24* (2013.01); *H04L 2209/601* (2013.01)

(58) Field of Classification Search
CPC ............. H04L 9/0833; H04L 2209/601; H04L 2209/24
See application file for complete search history.

(56) References Cited

U.S. PATENT DOCUMENTS

| | | | | |
|---|---|---|---|---|
| 9,397,985 B1 * | 7/2016 | Seger, II | ............ | H04L 63/0442 |
| 9,892,460 B1 * | 2/2018 | Winklevoss | ........... | G06Q 40/04 |
| 9,953,231 B1 * | 4/2018 | Medina, III | ............ | G06F 21/32 |
| 10,114,969 B1 * | 10/2018 | Chaney | ............... | G06F 21/6218 |
| 10,180,912 B1 * | 1/2019 | Franklin | ............ | G06F 12/1408 |
| 2016/0294783 A1 * | 10/2016 | Piqueras Jover | ... | H04L 63/0442 |
| 2016/0342976 A1 * | 11/2016 | Davis | ................ | G06Q 20/3829 |
| 2017/0070778 A1 * | 3/2017 | Zerlan | ............... | H04N 21/4408 |
| 2017/0103468 A1 * | 4/2017 | Orsini | .................... | G06Q 40/12 |
| 2017/0192994 A1 * | 7/2017 | Hong | .................... | G06F 16/164 |
| 2017/0344580 A1 * | 11/2017 | King | .................... | H04L 9/3239 |
| 2018/0315046 A1 * | 11/2018 | Joao | .................. | G06Q 20/4014 |
| 2019/0342074 A1 * | 11/2019 | Housholder | .......... | H04L 9/0637 |

* cited by examiner

*Primary Examiner* — John B King
(74) *Attorney, Agent, or Firm* — John L. Sotomayor

(57) ABSTRACT

The system and method presents a secure blockchain enabled encryption to foster the on and off toggle of a mute function in a voice call among two or more parties. Incoming information and data files may be encrypted using any preferred method of encryption, then sliced into segments, each segment of which is hashed and encrypted onto one or more blockchains depending upon the size of the segments desired. A retrieval and recombination mechanism is employed to quickly locate and decrypt all of the segments of each information file such that the blockchain distributed across multiple servers, including cloud-based servers.

19 Claims, 2 Drawing Sheets

TOGGLE MUTE

CLAIM TO PRIORITY

This Non-Provisional application claims under 35 U.S.C. § 120, the benefit of the Provisional Application 62/402,895, filed Sep. 30, 2016, Titled "Toggle Mute", which is hereby incorporated by reference in its entirety.

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Encryption technologies are well established in industries where data is private and must be secured against theft, intrusion, intentional corruption, or any other non-authorized access and/or use. As each generation of data encryption utilities has been created, effort has been expended by multiple groups and individuals to discover a way around the encryption capability so as to be able to access the private data. Public key encryption algorithms and one-time cipher systems can create very strong protection for data encrypted utilizing these methods. Additional methods have been created to attempt to address the creation of secure encryption methods that may be applied very quickly, so as to perform encryption in real-time, and to create ever more secure data storage for data being encrypted.

Blockchain systems are most commonly understood within the realm of financial transactions and the creation and use of digital currencies such as bitcoins. A blockchain has the advantage of providing a complete log of all transactions that are associated with the blockchain as an inherent feature of the blockchain. Additionally, a blockchain may permit a user to "walk" the blockchain to discover the provenance of any and all data stored within the blockchain. This feature is a very powerful means for knowing the origin and association of each portion of data stored within the blockchain, but comes at a cost of requiring more and more time to encode the data within a blockchain as transactions associated with the blockchain become more numerous.

Encrypted data may be stored within a blockchain, although the amount of time required to construct and/or access any portion of the blockchain can be prohibitively long.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
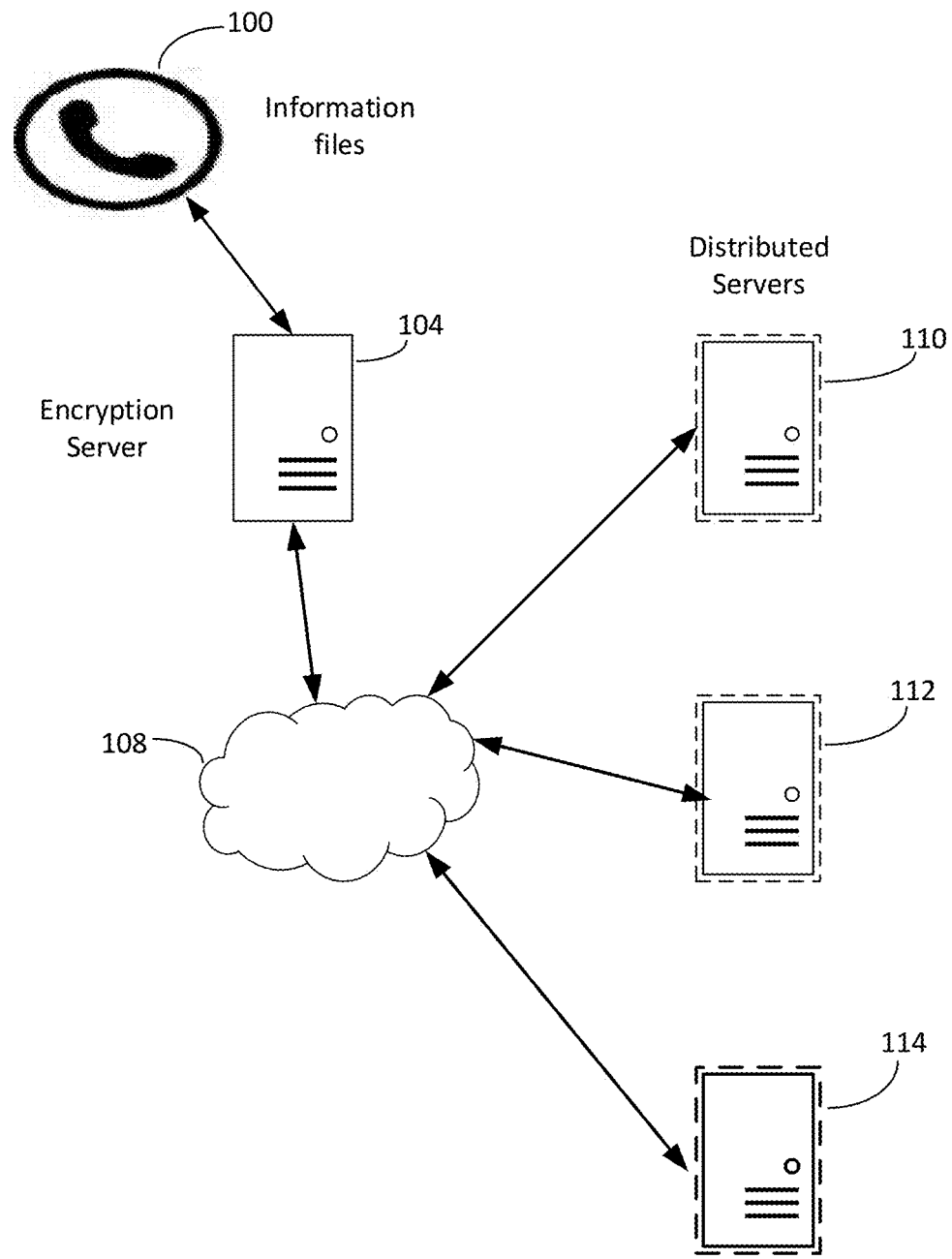
FIG. 1 is a view of an exemplary system implementation consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment", or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "blockchain" refers to a distributed database that maintains a continuously-growing list of data records secured from tampering and revision. It consists of data structure blocks which hold both data and programs. Each block within the blockchain holds batches of individual transactions and the results of any blockchain executables. Each block contains a timestamp and a link to a previous block.

The system and process herein presented is related to an ultra-secure, blockchain-based electronic file system encryption, storage, retrieval, and decryption system for toggling a mute function of a voice communication call during the process of the voice communication call.

In an embodiment, the system may consist of an electronic data transfer platform that incorporates the steps for the acceptance and secure encryption of data, files, multimedia, voice transmissions, or any other electronic media, storing the encrypted data for later retrieval, and decryption of data upon retrieval from storage. The system permits the secure upload, encryption, and transfer of sensitive and/or valuable electronic information using a novel blockchain capability to confirm secure delivery to a third party.

In an embodiment, the system facilitates:
Secure data upload to a secure server
Slicing of information into separate packets
Encryption of separate packets
Secure data uploads to blockchain
Enabling the torrent of blockchains
Retrieval of slices and decryption of separated blockchains
Identification of appropriate blockchains for reassembly into data packets
Delivery of data packets to a requesting user In an exemplary embodiment, electronic information in the form of files containing any form of information including, but not limited to, text, audio, video, multimedia, financial data, streaming data, digitized data, publications, software programs, or any other information transmitted electronically may be selected for secure encryption. In this exemplary embodiment, information files may be streamed to a user's computer system through a torrented stream of data that has been encrypted and placed in a blockchain, receiving slices of the information files as needed to ensure that the originally transmitted information file(s) are never fully intact during transmission. In this embodiment, each blockchain component may be compressed through 3D-based voxel logic and each block may be individually encrypted allowing for partial or fully homomorphic editing of the dataset. In this embodiment, the dataset is composed of a voice call transmission between two or more parties.

In this implementation, the public ledger maintained by the system may compile groups of files as the files are torrented through multiple servers. This public ledger may provide a proof of transaction and timestamp for the file and commercial activity.

In an embodiment, a blockchain capable secure encryption system process may begin with the acceptance of one or more information files from a user. Each information file may be hashed to create a unique identifier (ID) that not only identifies the information file, but also is used as part of the segment ID that is created for each segment of the information file. The information file may then be compressed to reduce the overall size of the file to be encrypted, however, the compression is not a requirement prior to encryption. If the user requires greater time sensitivity, compression of the information file may be omitted.

In this exemplary embodiment, the information file, whether compressed or uncompressed, may be encrypted utilizing any encryption cipher or methodology preferred by the user. The system may utilize any encryption cipher or method such as public/private key, Pretty Good Protection (PGP), RSA, or any other encryption method in use by the information file owner. Choosing the encryption methodology permits the owner to share the encrypted file with any other authorized user. In this exemplary embodiment, the file hash of the encrypted file, previously created, is gathered and utilized as the file name of the grid table portion of an echo key table to be created for each information file. The grid table portion may then be created with the file name hash from the originally submitted information file. As a portion of this step, the system also gathers the original information file name and file size.

In this exemplary embodiment, after the creation of the grid table portion, the information file is sliced into segments of about the same size. In a non-limiting example, file segments may be sized from about 200 Kilobytes to about 4 MegaBytes. The file size selected for each segment is dependent upon the latency requirements of the user; if the latency requirements are strict a smaller file segment size may be selected, or if the latency requirements are more relaxed a larger file segment size may be selected. In this embodiment the file segments are hashed individually to create a hash ID for each segment. The segments are catalogued in the grid table portion with each segment having a segment number, segment hash ID, and information file name. In this fashion each segment is identified with a particular information file. The grid table portion records the segment as coordinates of a table via both the information file hash and the segment hash as coordinates of the segment. Upon completion of the grid table portion, the segments and grid table portion are scheduled to the designated blockchain for the user information file. At this point in the process, all information files are encrypted, incorporated within one or more blockchain structures, and stored in a distributed database.

In an embodiment, reconstruction of one or more information files begins through the submission of a grid hash table associated with an information file and the information file name to a system server. The system server transmits the encrypted grid table to a user. The user decrypts the grid table using the pre-arranged encryption cipher or method, and submits the decrypted segment names and hash values to the system server to permit the system server to retrieve the segments from the electronic databases into which the segments have been distributed. The segments are then reassembled following the order and relationships recorded in the grid table. The segment reassembly produces the original encrypted information file.

The system server utilizes the user signature to decrypt the original encrypted information file. If the encrypted information file was compressed, the system server will perform a decompression action on the information file. If the encrypted information file was not compressed, the system server may skip this step in the process. The information file is tagged with the original information file name retrieved from the grid table. The reconstituted and decrypted information file may then be verified using the check hash originally generated from the information file prior to entering this process.

Key Management:

In an exemplary embodiment, encryption keys may be maintained either remotely or in a data file that is local to the user. Encryption keys may be handled within a grid table and stored in an electronic database stored on the client machine or on a system server. The encryption keys will not ever be placed in the master blockchain. By storing encryption keys remotely, a user account may be recoverable from a blockchain utilizing an echo key construct that is created during the encryption and storage portion of the process.

Echo Keys:

In an exemplary embodiment, echo keys permit a user or client to use an integral account recovery method, secure multiple machines under one account, and share information files between multiple users. In this exemplary embodiment, echo keys serve the role of a settling mechanism and are placed within each blockchain that is associated with an information file. Once created, the echo keys are stored within the grid table as the location mechanism for each slice of the information file. The grid table, and the echo keys stored within the grid table, is named after the hash of the information file. The grid table may then be hashed and encrypted and placed within each blockchain associated with the information file. Utilizing this mechanism, a user or another associate with the user may look up the echo keys by retrieving and decrypting the grid table as all copies of the blockchain associated with the information file will have the echo keys embedded within the blockchain as part of the grid table. In this exemplary embodiment, echo keys permit a client to use account recovery and secure multiple machines under one account. This permits the sharing of encrypted files among multiple users. Also, each machine that a client or user attaches to an account increases the complexity of the echo key set.

In an exemplary embodiment, to utilize echo keys a user or client may log into the secure service through a username and password check. Once logged into the secure service, the user may be directed to an echo key chain established for the user. The echo key chain may contain the user's account information. This information may include contacts and/or information files that are associated with the user. This information is supplied via the echo key table and it is encrypted with the user's encryption key, the system's encryption key, and the hardware signature of the system to which the information is being sent. The echo key chain is then destroyed after updating to the master login.

In this exemplary embodiment, if the user logs into a system into which they are not registered as an account holder, the user must provide access to the account from a known system. The echo key table portion of the grid table allows for account recovery if there is an admin echo key initialized at the genesis of the echo key table. In this instance, the genesis of the admin echo key may provide admin rights to permissions sets for information files. However, read access to information files may still be withheld from an admin. This creation of echo keys and an echo key table, both for users and admins, may permit the creation of a full-featured blockchain data base. Additionally, the creation of an echo key and echo key table mechanism allows the blockchain to perform maintenance on information files contained within the blockchain(s) in which the information files have been stored. Maintenance may include the management of creation and deletion of information files from the master blockchain at the initiation of a "cleanup" command.

In an exemplary embodiment, the document presents a system and method for secure data file encryption, where the secure encryption consists of receiving one or more data files from sources exterior to a first processor and slicing the received data files into smaller data segments. After creating the data segments, encrypting each data segment individually and uploading each individually encrypted data segment into a blockchain structure. The system and method transmitting the blockchain structure to a plurality of second processors, each second processor of which is physically separate from said first processor. The system and method then identifies and locates the blockchain structure to retrieve all segments and reassembles the blockchain structure within the first processor. After reassembly, decrypting the blockchain structure and reconstructing the one or more data files for delivery to a user.

In an exemplary embodiment, the slicing of the received data files results in segments from about 200 kilobytes to about 4 megabytes in size, and the encryption of each data segment may be performed using public/private key, PGP, RSA, or any other encryption technology in use. In this embodiment, each individual encrypted data segment is placed on one or more blockchains, each blockchain of which is a portion of the blockchain structure, where each blockchain in the blockchain structure further comprises an echo key and grid table. Additionally, the blockchain structure is distributed among a plurality of second processors that may be located within a cloud system, or may be located anywhere external to the first processor.

In an exemplary embodiment, the system and method begins reconstruction of the input data files by retrieving an echo key and grid table from any blockchain within the blockchain structure. Utilizing the echo key and grid table, the system reassembles the segments recorded within the echo key and grid table into the original one or more data files. The system and method then decrypts the reassembled one or more data files utilizing the same encryption method used to encrypt the one or more data files, whereupon the one or more data files may be delivered to a user in either encrypted or decrypted format.

In an embodiment, a toggle mute function is a capability for muting the voice of one or more parties to only certain, selected parties on a conference call comprised of two or more connected individuals who are not co-located physically such as on a conference call or in a chat room. In a non-limiting example individuals holding top secret security clearances on a military or government conference call could voice data that is top secret such that individuals having only a secret security clearance would not be authorized to hear; the system would permit the continuance of a conference call by muting the portion of the conference call going to those callers having the lower security clearance without having to terminate the existing conference call. This technology may enabled through a single channel, cross domain, VPN, or distributed across a blockchain distributed ledger enabled system.

Other use cases include corporate board meetings with offsite employees, consultations (different payment amounts equal different levels of access to a symposium or lecture), and other forms of conference calls or chat rooms that could include text, video, images, source code, and graphics.

The data could be decrypted via
1. Each user is provided a key set by their superior with a tiered level of access
2. Each blockchain is founded upon sets of rules that control who has access A VoIP engine negotiates and redirects streams based on metadata.

Turning now to FIG. 1, this figure presents a view of an exemplary system implementation consistent with certain embodiments of the present invention. In an exemplary embodiment, information files 100 are transmitted from one or more user systems to an encryption server 104. The encryption server 104 is configured to segment and encrypt the information files 100 received from the one or more user systems. The encryption server 104 utilizes a blockchain enabled operational module to segment and encrypt the received information files 100 and transmits the encrypted information file segments to digital storage in the cloud 108. In an exemplary embodiment, the segmented, encrypted information files may be distributed within a plurality of cloud based servers (110, 112, 114). In this manner, the system has encrypted and stored information file segments in a distributed fashion such that retrieving any one information file segment will not compromise the information file as a whole.

In this exemplary embodiment, information file segment locations are tracked by the encryption server. When requested by the user, information files may be retrieved from each of the storage servers (110, 112, 114), through the cloud storage management 108 and returned to the encryption server 104. The encryption server 104 provides both the decryption and reassembly of the retrieved information file segments back into the information files 100 that were originally transmitted to the encryption server 104.

Figure 2:
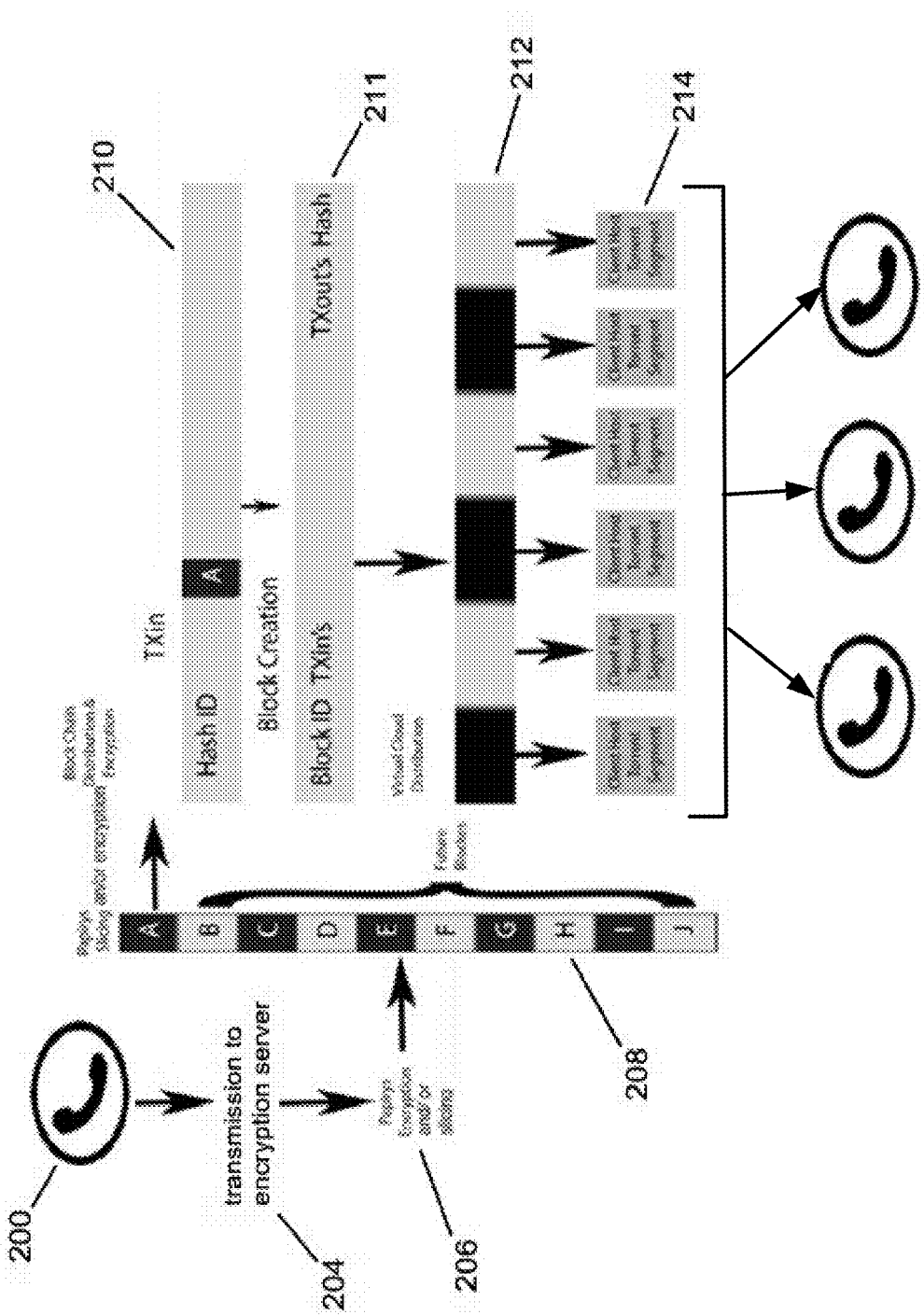
FIG. 2 is a view of a file streaming function consistent with certain embodiments of the present invention.

Turning now to FIG. 2, this figure presents a view of a file streaming function consistent with certain embodiments of the present invention. In an exemplary embodiment, the system presents the transmission of one or more information files 200 from a user. The information files 200 may be transmitted to the encryption server 204 to begin the process of secure encryption. The encryption server receives the information files at 206 and creates a hash for each received file, storing the created hash as the unique ID for each received file. In this exemplary embodiment, the file hash of the encrypted file, previously created, is gathered and utilized as the file name of the grid table portion of an echo key table to be created for each information file. The grid table portion may then be created with the file name hash from the originally submitted information file. As a portion of this step, the system also gathers the original information file name and file size.

In this exemplary embodiment, after the creation of the grid table portion, the information file is sliced into segments of about the same size at 208. In a non-limiting example, file segments may be sized from about 200 Kilobytes to about 4 MegaBytes. The file size selected for each segment is dependent upon the latency requirements of the user; if the latency requirements are strict a smaller file segment size may be selected, or if the latency requirements are more relaxed a larger file segment size may be selected. In this embodiment the file segments are hashed individually to create a hash ID for each segment. The segments are catalogued in the grid table portion with each segment having a segment number, segment hash ID, and information file name at 210. In this fashion each segment is identified with a particular information file. The grid table portion records the segment as coordinates of a table via both the information file hash and the segment hash as coordinates of the segment.

In this exemplary embodiment, the file segments are encrypted into separate blocks within a blockchain construct at 211. The blockchain created from each group of segments that are sliced from each information file is referenced utilizing a unique set of IDs from the original file name, the segment hash, and the segment number and storing this information into a grid table associated with that particular information file. This information is also encrypted and stored within a block on the blockchain, providing identification and information security for the segments and information file as a whole.

In this exemplary embodiment, at 212 each hashed and encrypted segment may be transmitted to digital storage within a cloud storage system. The cloud system may then transmit the hashed and encrypted segments at 214 in a torrent to a plurality of servers, where individual segments may be placed on different servers to permit complete dissociation between segments, such that if a segment is retrieved from a single server, the remainder of the segments required to decrypt and reconstitute the information file are not located on the same server.

In this exemplary embodiment, at the termination of this encryption and distribution process, the information files from the user are separated into a plurality of segments, each of which is encrypted into the blockchain, and the entirety of the information file may only be retrieved through the retrieval of all of the segments and the grid table associated with the information file as it is stored on a blockchain.

While certain illustrative embodiments have been described, it is evident that many alternatives, modifications, permutations and variations will become apparent to those skilled in the art in light of the foregoing description.

I claim:

1. A system for secure entitled data stream encryption, comprising:
   a first hardware data processor operative to receive one or more data streams from sources exterior to the first data processor, wherein the one or more data streams includes a real-time voice communication;
   a module operative to assign entitlements to the one or more data streams;
   a module operative to slice the received one or more data streams into smaller data segments;
   a module operative to encrypt each data segment individually;
   a module operative to upload each individually encrypted data segment into a blockchain structure;
   a module operative to transmit the blockchain structure to a plurality of second data processors, each second data processor of which is physically separate from said first data processor;
   a module operative to identify and locate the blockchain structure and reassemble the blockchain structure within said first data processor;
   a decrypting module operative to decrypt the blockchain structure and reconstruct the one or more data streams for delivery to a user;
   said decrypting module operative to decrypt the data streams using entitlement keys, wherein said decrypting module includes a toggle mute function that provides the capability of toggled delivery of the real-time voice communication to the user.

2. The system of claim 1, where the entitlement keys are assigned to users or user groups.

3. The system of claim 1, where users or users groups are assigned entitlements based on initialized settings from the first data processor or external sources.

4. The system of claim 1, where the encryption of each data segment is performed using public/private key, PGP, RSA, or any other encryption technology in use.

5. The system of claim 1, where each individual encrypted data segment is placed on one or more blockchains, each blockchain of which is a portion of the blockchain structure, and where each blockchain in the blockchain structure further comprises an echo key, entitlement keys, and grid table.

6. The system of claim 1, where the blockchain structure is distributed among the plurality of second data processors that are located within a cloud system or anywhere external to the first data processor.

7. The system of claim 1, where a reassembling module is operative to retrieve an echo key, entitlement keys, and grid table from any blockchain within the blockchain structure.

8. The system of claim 7, where the reassembling module reassembles the data segments recorded within the echo key, entitlement keys, and grid table into the original one or more data streams.

9. The system of claim 8, further comprising a module that is operative to decrypt the reassembled one or more data streams utilizing the same encryption method used to encrypt the one or more data streams.

10. The system of claim 1, where the one or more data streams are delivered to the user in either encrypted or decrypted format.

11. A method for secure data file encryption, comprising:
    receiving one or more data files from sources exterior to a first data processor, wherein the one or more data files includes a real-time voice communication;
    assigning entitlement keys;
    slicing the received one or more data files into smaller data segments;
    encrypting each data segment individually;
    uploading each individually encrypted data segment into a blockchain structure;
    transmitting the blockchain structure to a plurality of second data processors, each second data processor of which is physically separate from said first data processor;
    identifying and locating the blockchain structure and reassembling the blockchain structure within the first data processor;
    decrypting the blockchain structure and reconstructing the one or more data files;
    decrypting the one or more data files with entitlement keys, wherein said decrypting module includes a toggle mute function that provides the capability of toggled delivery of the real-time voice communication to a user.

12. The method of claim 11, where the slicing of the received one or more data files results in data segments from 256 kilobytes to 4 megabytes in size.

13. The method of claim 11, where the encryption of each data segment is performed using public/private key, PGP, RSA, or any other encryption technology in use.

14. The method of claim 11, where each individual encrypted data segment is placed on one or more blockchains, each blockchain of which is a portion of the blockchain structure.

15. The method of claim 14, where each blockchain in the blockchain structure further comprises an echo key, entitlement keys, and grid table that is retrieved from any blockchain within the blockchain structure.

16. The method of claim 11, where the blockchain structure is distributed among the plurality of second data processors that are located within a cloud system or anywhere external to the first data processor.

17. The method of claim 16, further comprising reassembling the data segments recorded within an echo key, entitlement keys, and grid table into the original one or more data files.

18. The method of claim 17, further comprising decrypting the reassembled one or more data files utilizing the same encryption method used to encrypt the one or more data files.

19. The method of claim 11, where the one or more data files are delivered to the user in either encrypted or decrypted format.

* * * * *